UNITED STATES PATENT OFFICE.

ALPHONSE LAMBERT, OF ROME, ITALY.

COMPOSITION FOR HARDENING AND PRESERVING IMPREGNABLE SOFT WOODS.

1,346,830.     Specification of Letters Patent.     Patented July 20, 1920.

No Drawing.     Application filed January 4, 1919. Serial No. 269,672.

*To all whom it may concern:*

Be it known that I, ALPHONSE LAMBERT, a subject of the King of Belgium, and residing at Rome, Italy, (whose post-office address is Via Gregoriana 46, Rome,) have invented certain new and useful Improvements in Compositions for Hardening and Preserving Impregnable Soft Woods, of which the following is a specification.

This invention has relation to a composition for hardening impregnable soft woods, and at the same time for preserving and fire-proofing the same. The use of the invention insures also a longer life to the wooden structures of any kind built on land, preserving them against the *Termes lucifugus*, the same for the wooden structures on water, preserving them against the *Teredo navalis*, and other marine wood-destroying worms.

The invention is characterized by impregnating the wood with a solution of metallic salts, for instance, copper and zinc salts dissolved in ammonia, (this latter being obtained from the distillation of coal) mixed with some borax, and chromate of potassium, which substances are first dissolved in water, to the resulting mixture being added some cement powder.

The solution must remain alkaline, viz: It shall contain an excess of ammonia of about 1%.

To the solution there may be optionally added from one to two parts by weight of salicylic acid and the same amount of sodium fluorid, for every 100 parts by weight of the product not dissolved, with the purpose of reinforcing it.

To obtain the solution hereabove referred to, one may proceed as follows:

From 4 to 6 parts in weight of copper salts (*e. g.* sulfate or chlorid) and from 2 to 4 parts in weight of zinc salts (*e. g.* sulfate or chlorid) are disolved with the necessary quantity of concentrated ammonia water of a strength below 14° B., for perfectly dissolving the metallic salts, for neutralizing their acids and for leaving about 1% of ammonia in excess. To the mixture are added from 2 to 3 parts by weight of borax, from 1 to 2 parts by weight of chromate of potassium; the borax and the potassium chromate being firstly dissolved in 10 to 20 parts by weight in water; to the resulting mixture are added from 5 to 10 parts by weight of Portland cement or quick-setting cement in the form of very fine powder.

The mixture must be diluted with water for being injected under pressure, after having produced a vacuum, in the treating vessel, so that said liquid may contain at least 0.360 parts by weight of metallic salts for each 100 parts of injected liquid, producing a substantial penetration of the cement through the pores of the wood and a still deeper penetration into the wood, of the solution of salts and of the other substances.

I claim:

1. A composition for hardening impregnable soft woods, for preserving, water-proofing and fire-proofing them, and for preventing their destruction by the action of the termes or teredos, said compositions comprising an alkaline solution of copper and zinc salts, borax, and a soluble chromate in diluted ammonia water, said solution containing an insoluble cement in suspension.

2. A composition for impregnating wood, said composition comprising an alkaline solution containing 4 to 6 parts by weight of salts of copper, 2 to 4 parts by weight of salts of zinc, both dissolved in ammonia water to which are added from 2 to 3 parts by weight of borax, and from 1 to 2 parts by weight of potassium chromate, dissolved in 10 to 20 parts by weight of water, such solution being alkaline, and containing, in an undissolved state from 5 to 10 parts by weight of fine cement powder.

3. A composition for hardening, water-proofing and fire-proofing soft woods, comprising an alkaline preservative solution of poisonous metal salts, borax, salicylic acid, a soluble fluorid, a soluble chromate and ammonia water containing a finely divided cement, substantially as described.

In testimony whereof I have hereunto signed my name in the presence of two witnesses.

ALPHONSE LAMBERT.

Witnesses:
    A. PIZZOCOLO,
    L. DRUDI.